Oct. 10, 1950 — J. R. HOLLINS — 2,525,033
DIRECTIONAL SIGNAL OPERATOR
Filed March 5, 1949 — 2 Sheets-Sheet 1

INVENTOR.
Jesse R. Hollins
BY
HIS ATTORNEY.

Oct. 10, 1950   J. R. HOLLINS   2,525,033
DIRECTIONAL SIGNAL OPERATOR
Filed March 5, 1949   2 Sheets-Sheet 2
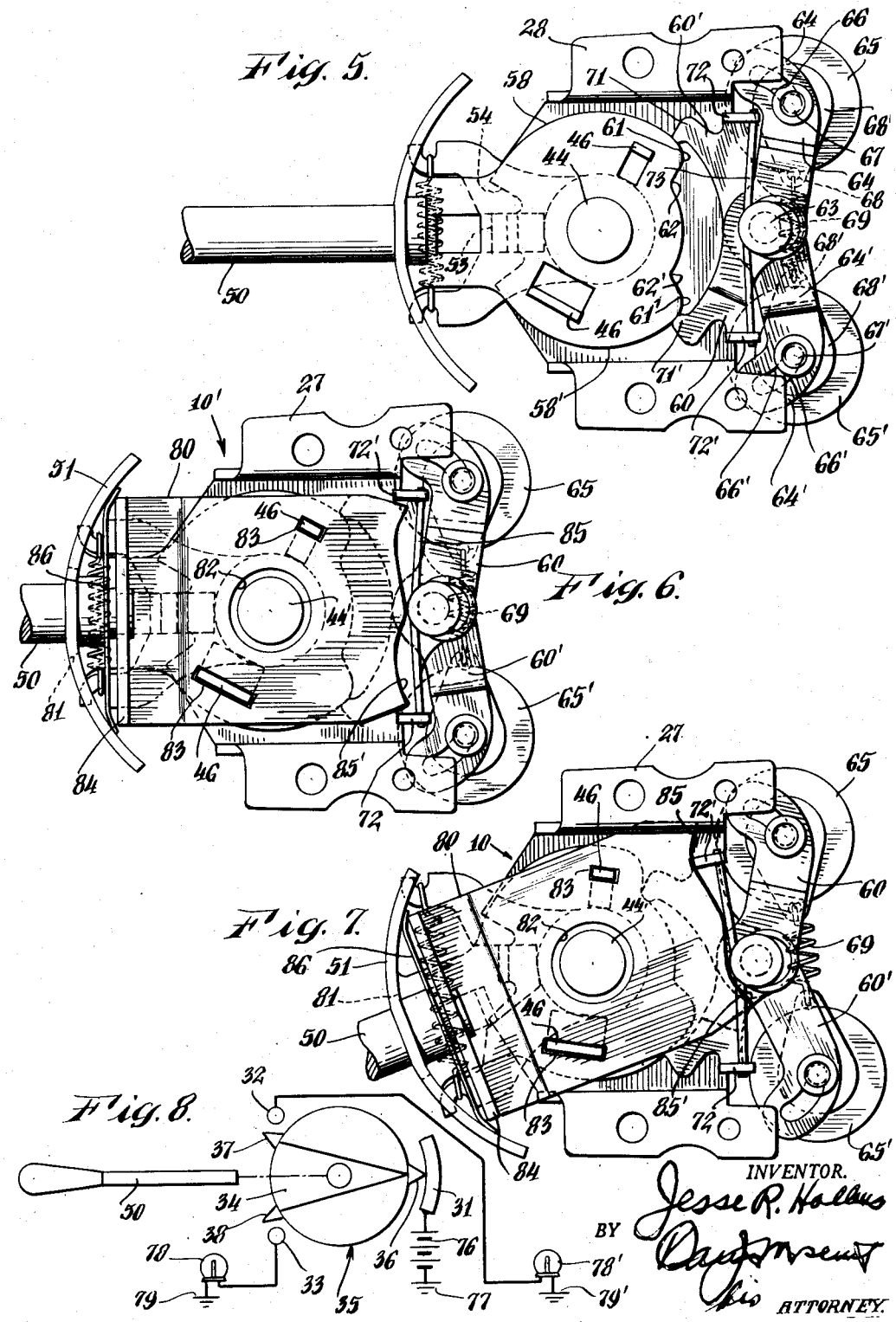

Patented Oct. 10, 1950

2,525,033

UNITED STATES PATENT OFFICE 2,525,033

DIRECTIONAL SIGNAL OPERATOR

Jesse R. Hollins, Brooklyn, N. Y.

Application March 5, 1949, Serial No. 79,879

9 Claims. (Cl. 200—59)

This invention relates to vehicle turn indicating or directional switches and more particularly to such switches of the type which, when the selector lever has been operated to indicate a turn, are locked in the selected position until a corresponding movement of the vehicle steering wheel has been effected, after which mechanism operable by the steering wheel releases the switch and restores it to neutral.

Directional switches of the type to which the present invention is directed generally include a suitable housing which is clamped or otherwise secured to a vehicle steering column immediately below the steering wheel and in a position of ready accessibility to the driver. The switch includes a projecting selector handle which may be readily flipped by the driver's fingers without removing the driver's hand from the steering wheel.

The selector handle is rigidly attached to a cam plate which is oscillatably mounted in the frame, and the cam plate is connected to an oscillatable switch contact member selectively engageable with either of a pair of contacts connected in circuit with the turn indicator lamps on the ends of the vehicle. The movable contact member is continuously connected to the vehicle electric power supply, so that the indicator lamps are selectively illuminated in response to movement of the selector handle.

A pair of spring pressed dogs are oscillatably mounted in the frame, and selectively cooperate with the cam plate to lock the same in either position to which the cam plate is moved by the selector handle. Actuating discs or rollers are mounted on the dogs for cooperation with abutments which are movable with the steering wheel. Thus, when the selector handle is moved to signal a "left turn," for example, the dogs lock the cam plate and switch contact member in such "left turn" position. When the steering wheel is turned a predetermined amount to the left, and then returned to its mid-position to straighten the vehicle on its new course, one of the abutments strikes the disk on the locking dog to release the cam plate to return to "neutral" under the influence of a centering spring arrangement. The disks are yieldingly mounted on the dogs in such manner that the locking dog is not operated by the steering wheel abutment when the wheel is turned in the indicated direction, but is operated only when the wheel is returned to its mid-position to straighten the vehicle on its new course.

It frequently happens that, after the switch has been set to indicate a turn, the driver changes his mind. Furthermore, in certain directional changes such as when the vehicle goes from one lane to another of a multi-lane highway, the turning movement of the steering wheel is insufficient to contact the abutments with the locking dog disk to restore the switch to "neutral." In either of these cases, or in any other case, it is substantially impossible to manually reset the switch, once it has been operated, without damaging the switch mechanism.

To overcome this disadvantage, the present invention provides novel dog unlocking means operable by the selector handle to release the cam plate for a return to "neutral." Specifically, a second cam plate is oscillatably mounted on the same axis as the switch operating, dog locked cam plate. This second cam plate has a lost motion connection with the main cam plate and is secured directly to the selector handle. When the latter is operated, the second cam plate, after a small "take-up" movement, swings the main cam plate to operate the switch. One of the dogs then locks the main cam plate as previously described. The second cam plate has a cam surface engaging the dogs when the latter are in a locking position.

If the selector handle is manually moved toward "neutral" such cam surface swings the dog out of locking position during the "take-up" movement of the second cam plate. This releases the main cam to return to neutral. The locking dogs are released by the steering wheel abutments in the same manner as before.

It is accordingly among the objects of this invention to provide an automatically locked and unlocked vehicle turn indicator selector switch which may be manually reset without difficulty.

Another object is to provide means for adapting such an automatically locked and unlocked switch for selective manual unlocking.

These and other objects, advantages and novel features of the invention will be apparent from the following description and the accompanying drawings. In the drawings:

Fig. 5 is an inverted plan view of the switch automatic locking mechanism;

Fig. 6 is a view similar to Fig. 5 showing the switch automatic locking mechanism as modified in accordance with the present invention;

Fig. 7 is a view similar to Fig. 6, showing the locking mechanism as locked in the "right turn" position and conditioned for manual unlocking by movement of the selector handle to "neutral"; and Fig. 8 is a schematic wiring diagram of the indicator lamp circuit associated with the invention switch.

Figure 1:
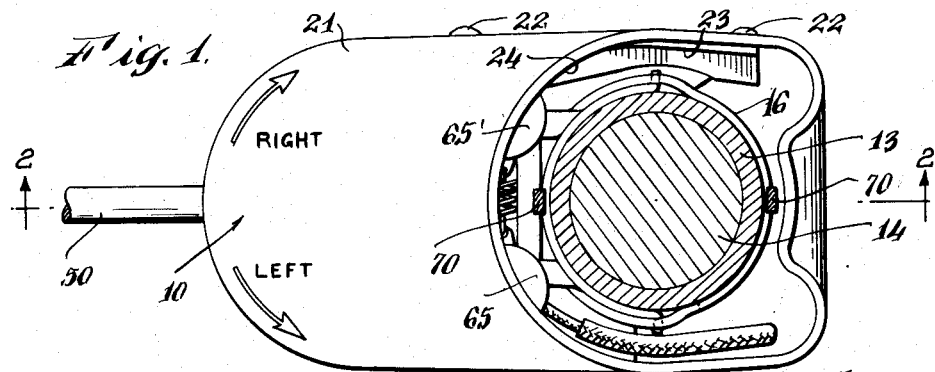
Fig. 1 is a plan view of an automatically locked and unlocked direction indicator switch as attached to an automotive vehicle steering column, on the line 1—1 of Fig. 2.
Figure 2:
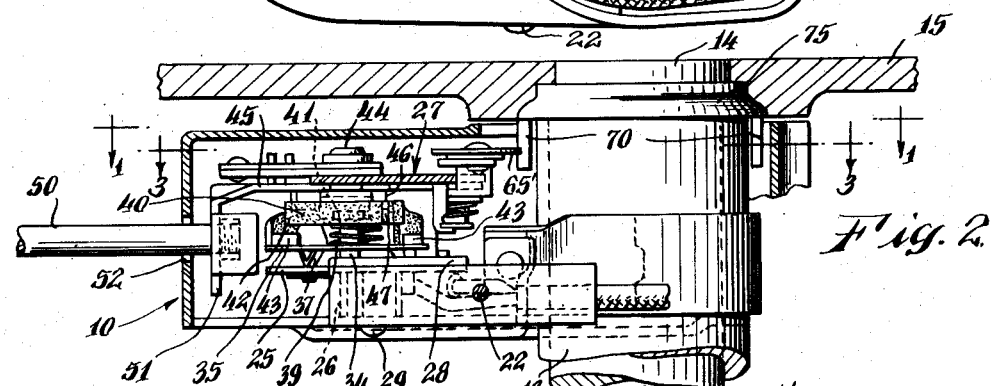
Fig. 2 is a longitudinal sectional view on the line 2—2 of Fig. 1.

Referring first to Figs. 1 through 5 of the drawings, the illustrated automatically locked and unlocked vehicle turn indicator switch 10 is of conventional construction and is generally similar to that shown and described in U. S. Patent No. 2,276,413, issued March 17, 1942, to C. W. Moore for "Switch Mechanism." Only such parts of switch 10 are shown and described as are necessary for a clear understanding of the nature and purpose of applicant's improved switch construction, which is shown in Figs. 6 and 7, and reference may be made to the Moore patent for further details.

Switch 10 includes a base 11 having one concave end 12 to receive the steering column 13 of an automotive vehicle. Column 13 supports the steering post 14 having a steering wheel 15 secured to its outer end in a known manner. Base 11 is secured to column 13 immediately below steering wheel 15 by a clamp 16 embracing upstanding arcuate lugs 17 on end 12 and tightened by a nut and bolt arrangement 18. The base is secured within a housing 21 by screws 22 threaded into side flanges 23 of base 11, and housing 21 has an opening 24 therein through which passes column 13.

The electrical component of switch 10 includes a contact plate 25 of insulating material supported on base 11 on spacers 26. Above plate 25 is a bridge member 27 having depending leg portions with flanges 28 resting on plate 25, and rivets 29 secure plate 25 and member 27 to base 11. Suitable electric contacts 31, 32 and 33 (Fig. 8) are mounted on plate 25 to extend above the upper surface thereof, and a stud 34 on plate 25 acts as a rotation axis for a switch plate 35. The latter carries contacts 36, 37 and 38 engageable with contacts 31, 32 and 33, respectively. Contact 31 is elongated arcuately so that contact 36 is in continuous engagement therewith throughout the range of movement of plate 35. Contacts 37 and 38 are each spaced from a contact 32, 33, respectively, so that contact 37 will engage contact 32 when the switch 10 is operated to the "right turn" position and contact 38 will engage contact 33 in the "left turn" position of the switch.

Switch plate 35 is biased toward contact plate 25 by a coil spring 39 surrounding stud 34 and engaging plate 35 and an overlying member 40 of dielectric material which is rotatable on stud 34 and held in position by stud head 41. Projecting from diametrically opposite sides of member 40 are depending lugs 42 which more or less loosely engage correspondingly formed slots 43 in switch plate 35, so that oscillation of member 40 will impart oscillation to switch plate 35.

Overlying member 40 and underlying bridge 27 is a switch operating, cammed lock plate 45 oscillatably mounted on a stud 44 secured in bridge 27. Plate 45 has diametrically arranged depending lugs 46, 46 which engage slots or notches 47, 47 in the periphery of member 40, whereby oscillation of plate 45 will oscillate member 40 and switch plate 35. Cam plate 45 is oscillated by the switch operating handle 50 which is threaded into a depending bracket 51 on plate 45 and extends outwardly through a slot 52 in housing 21. A lug 53 projects upwardly from cam plate 45 within an arcuate recess 54 in bridge 27, this recess thus limiting the movement of plate 45 when moved from the neutral or "off" position to either "on" position.

To bias plate 45 to the center or "off" position, and prevent the plate passing through the "off" position when moved toward the latter from either "on" position, a pair of arms 55, 55 are pivotally mounted on stud 44 above bridge 27 and extend toward handle 50. Arms 55, 55 extend on either side of lug 53, and their outer ends are interconnected by a coil spring 56. The arms also extend on opposite sides of a lug 57 on bridge 27. Since lug 57 is fixed and lug 53 movable, the spring tensioned arms 55, 55 bias these lugs into alignment and thus bias cam plate 55 to the "off" position.

Figure 3:
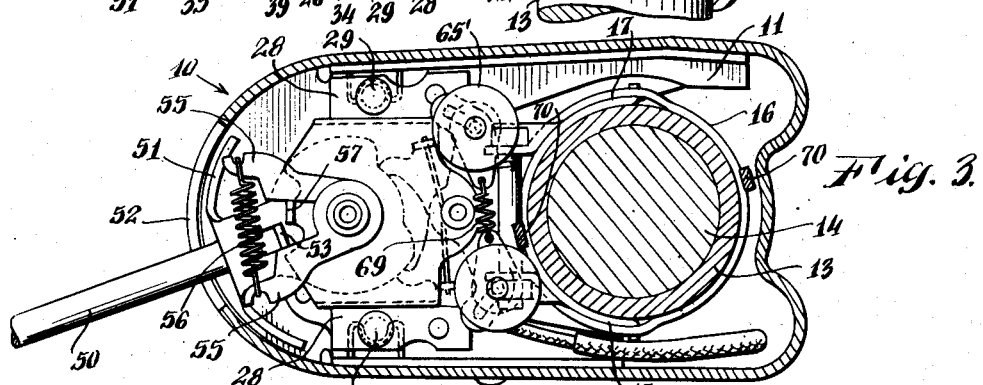
Fig. 3 is a longitudinal sectional view on the line 3—3 of Fig. 2 showing the switch locked in the "left turn" position.
Figure 4:
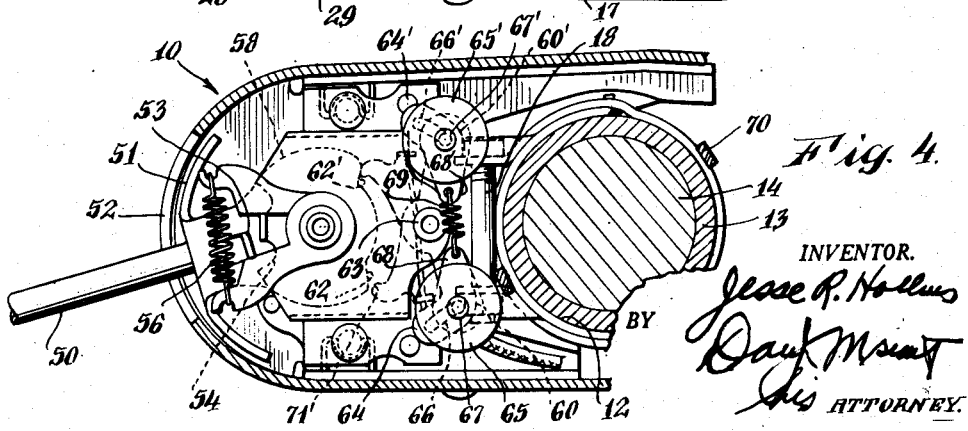
Fig. 4 is a view similar to Fig. 3 showing the switch being returned to the "neutral" or "off" position.

As shown more particularly in Figs. 3, 4 and 5, the opposite side edge portions 58, 58' of cam plate 45 are portions of the circumference of a circle whose center is stud 44, and the inner edge portion between portions 58, 58' forms a locking cam surface. This inner edge surface includes spaced, correspondingly arranged flat surface portions 61, 61' which terminate inwardly in locking recesses or detents 62, 62'.

A pair of levers 60, 60' is mounted on a common pivot or stud 63 beneath bridge 27, stud 63 being fixed on the bridge. Levers 60, 60' are mounted in crossed relation, and stud 63 passes through an intermediate point of each lever. The outer extremities 64, 64' of levers 60, 60' are offset outwardly from bridge 27, and an arcuate slot 66, 66' is formed in each such extremity. Pins 67, 67' are slidably mounted in each slot and carry actuators such as disks 65, 65'. Relatively thin members 68, 68' are mounted on pins 67, 67' and interconnected by a coil spring 69 so that pins 67, 67' and their disks 65, 65' are biased toward the inner ends of slots 66, 66', respectively.

The inner extremities 71, 71' of levers 60, 60' are adapted to engage and ride upon the side and inner end edge portions of plate 45, and carry depending lugs 72, 72' which are engaged by the ends of a coil spring 73 wrapped around stud 63. Spring 73 biases the levers so that extremities 71, 71' are continually engaged with the edge of plate 45. In the "off" position of the switch (Fig. 5), extremities 71, 71' are engaged with circumferential side portions 58 and 58', respectively. In this position, actuators 65, 65' are retracted out of the path of travel of a pair of lugs 70, 70' which depend from a collar 75 rotatable with steering wheel 15.

The operation of the conventional turn indicator switch 10 thus far described will be best understood by reference to Figs. 3 and 4. Before referring to these figures, however, reference should be made to Fig. 8 which schematically shows the electrical circuits associated with switch 10. Contact 31 is connected to the vehicle electric power source, such as a battery 76 grounded at 77. Contacts 32, 33 are connected, respectively, to "right" and "left" lamps 78 and 78' grounded at 79, 79'. Contact 36 continuously engages contact 31 and, as switch plate 35 is of conductive material, is continuously in circuit connection with contacts 37, 37, as schematically indicated. When selector handle 50 is swung to the "left turn" position, contact 38 engages contact 33 to light "left" lamp 78. Similarly, in the "right turn" position of handle 50, contact 37 engages contact 32 to light "right" lamp 78'.

When handle 50 is swung to the "left turn" position of Fig. 3, plate 45 is oscillated counter-clockwise and the inner extremity 71' of lever 60 rides along flat surface 61' into detent 62' locking plate 45 against clockwise movement. As lever 60 swings counter-clockwise, disk 65 is projected outwardly into the path of lugs 70.

When steering wheel 15 is turned counter-clockwise to direct the vehicle to the left, lugs 70 strike disk 65. No movement of lever 60 takes place, however, as pin 67 moves outwardly in slot 66, tensioning spring 69. When wheel 15 is rotated clockwise to straighten the vehicle on its new course, however, a lug 70 striking disk 65 from the opposite direction (Fig. 4), forces the disk and pin 67 toward the inner end of slot 66. As the pin 67 cannot move any further along the slot, lever 60 is swung clockwise so that cam plate 45 is biased to the "off" position by spring 56 and an arm 55 engaging lug 53.

As previously stated, it is sometimes desirable to manually reset the switch to the "off" position or to the other "on" position after it has been moved to one "on" position. Also, the turning movement of the wheel 15 is sometimes insufficient to unlock the switch. In either event, levers 60 or 60' maintain cam plate 45 locked in the first selected "off" position. The modification of the switch according to the invention, and as shown in Figs. 6 and 7, effectively provides for such manual resetting.

Referring to Figs. 6 and 7, handle 50 is unscrewed from bracket 51 and the latter has an arcuately elongated slot 81 cut therein. Stud 44 is replaced by a slightly longer stud 44' whose head seats in a countersunk central recess 82 in a second or unlocking cam plate 80 pivoted on stud 44' and in engagement with the undersurface of cam plate 45. Plate 80 is formed with diametrically arranged slots 83 each receiving a lug 46 on plate 45 and each somewhat longer than the received lug. Thereby, plate 80 has some rotational "play" or "take-up" relative to plate 45.

The outer end of plate 80 has a depending bracket 84 into which handle 50 is screwed after insertion through slot 81. Plate 80 is shown as generally rectangular, although its general shape is not important. The inner edge of the plate is formed, adjacent each end, with concave surfaces 85, 85' which surfaces are inwardly of detents 62, 62'. A flat spring 86 has an aperture receiving the threaded end of handle 50, which latter locks the spring to bracket 84, and the ends of spring 86 bear frictionally against the inner surface of bracket 51.

The invention switch 10' operates in the following manner: When handle 50 is swung to the "right turn" position of Fig. 7, plate 80 turns without moving plate 45 until lugs 46 engage the ends of slots 83. Plate 45 is then swung in the same manner as described until the inner extremity 71' of lever 60' rides into detent 62, locking plate 45 against reverse movement. In the locking position of lever 60', its lug 72' is engaged in concave cam portion 85 of lever 80.

Under normal turn conditions, plate 45 remains locked until released by lugs 70 acting on lever 60' as previously described. However, should it be desired, for any reason, to manually reset the switch 10' to "off" or to the other "on" position, the vehicle operator simply moves lever 50 to the desired position. For example, if lever 50 is moved to "off" from the "right turn" position of Fig. 7, plate 80 is moved clockwise, as viewed in Fig. 7, cam surface 85 forces lug 72' and lever 60' to swing clockwise, releasing extremity 71' from detent 62. This action takes place before slots 83 engage lugs 46 to move plate 45. The released cam plate 45 is then biased to "off" as previously described.

The invention thus provides an automatically locked and unlocked selector switch which may be manually reset, without forceful effort if desired, and which otherwise operates in the same manner as heretofore. The switch 10' can be built with unlocking plate 80 incorporated therein, or switch 10, of conventional construction, can be easily and inexpensively modified as described to incorporate unlocking cam plate 80.

While a specific embodiment of the invention has been shown and described in detail to illustrate the application of the principles thereof, it should be understood that the invention may be otherwise embodied without departing from such principles.

What is claimed is:

1. A steering column mounted vehicle turn indicator switch of the automatically locked and automatically unlocked type comprising, in combination, a rotatable switch plate having contacts selectively cooperable with a plurality of stationary contacts, a rotatable cam plate connected to rotate said switch plate, means biasing said cam plate to a switch-off position, locking means operable, upon rotation of said cam plate to either of a pair of switch-on positions, to engage and lock said cam plate in the operated position, said locking means automatically releasing said cam plate in response to predetermined movements of the vehicle steering mechanism, and manually operated rotatable cam means selectively operable to actuate said locking means to release said cam plate independent of the automatic cam plate release operation of said locking means.

2. A steering column mounted vehicle turn indicator switch of the automatically locked and automatically unlocked type comprising, in combination, a rotatable switch plate having contacts selectively cooperable with a plurality of stationary contacts, a rotatable cam plate connected to rotate said switch plate, means biasing said cam plate to a switch-off position, locking means operable, upon rotation of said cam plate to either of a pair of switch-on positions, to engage and lock said cam plate in the operated position, said locking means automatically releasing said cam plate in response to predetermined movements of the vehicle steering mechanism, manually operated rotatable cam means selectively operable to actuate said locking means to release said cam plate independent of the automatic cam plate release operation of said locking means, said cam means having a lost motion rotation effecting connection to said cam plate, and a switch operator secured to said cam means.

3. A steering column mounted vehicle turn indicator switch of the automatically locked and automatically unlocked type comprising, in combination, a rotatable switch plate having contacts selectively cooperable with a plurality of stationary contacts, a rotatable cam plate connected to rotate said switch plate, means biasing said cam plate to a switch-off position, locking means engaging said cam plate and effective upon rotation of said cam plate to either of a pair of switch-on positions, to lock said cam plate in the operated position, said locking means automatically releasing said cam plate in response to predetermined movements of the vehicle steering mechanism, rotatable cam means having an axis of rotation coincident with that of said cam plate, said cam means engaging said locking means in either switch-on position, a switch operator secured to said cam means, and means connecting said cam plate to said cam means for rotation responsive to movement of said switch operator, said cam means, upon movement toward the switch-off position, actuating said locking means to release said cam plate independent of the automatic cam plate release operation of said locking means.

4. A steering column mounted vehicle turn indicator switch of the automatically locked and automatically unlocked type comprising, in combination, a rotatable switch plate having contacts selectively cooperable with a plurality of stationary contacts, a rotatable cam plate connected to rotate said switch plate, means biasing said cam plate to a switch-off position, locking means engaging said cam plate and effective upon rotation of said cam plate to either of a pair of switch-on positions, to lock said cam plate in the operated position, said locking means automatically releasing said cam plate in response to predetermined movements of the vehicle steering mechanism, rotatable cam means having an axis of rotation coincident with that of said cam plate, said cam means engaging said locking means in either switch-on position, a switch operator secured to said cam means, and a lost motion connection between said cam means and said cam plate, said cam means, upon movement toward the switch-off position, actuating said locking means to release said cam plate independent of the automatic cam plate release operation of said locking means.

5. A steering column mounted vehicle turn indicator switch of the automatically locked and automatically unlocked type comprising, in combination, rotatable switch plate means having contacts selectively cooperable with a plurality of stationary contacts, a rotatable cam plate having projecting lugs interfitting corresponding slots in said switch plate means to rotate the latter, means biasing said cam plate to a switch-off position, locking means engaging said cam plate and effective, upon rotation of said cam plate to either of a pair of switch-on positions, to lock said cam plate in the operated position, said locking means automatically releasing said cam plate in response to predetermined movements of the vehicle steering mechanism, an unlocking plate rotatable about the axis of rotation of said cam plate and having slots receiving said lugs while providing for limited relative rotation of said plates, said unlocking plate engaging said locking means in either switch-on position, and a switch operator secured to said unlocking plate, said unlocking plate, upon movement toward the switch-off position, actuating said locking means to release said cam plate independent of the automatic cam plate release operation of said locking means.

6. A steering column mounted vehicle turn indicator switch of the automatically locked and automatically unlocked type comprising, in combination, rotatable switch plate means having contacts selectively cooperable with a plurality of stationary contacts, a rotatable cam plate having projecting lugs interfitting corresponding slots in said switch plate means to rotate the latter, means biasing said cam plate to a switch-off position, locking means engaging said cam plate and effective, upon rotation of said cam plate to either of a pair of switch-on positions, to lock said cam plate in the operated position, said locking means automatically releasing said cam plate in response to predetermined movements of the vehicle steering mechanism, an unlocking plate rotatable about the axis of rotation of said cam plate and having slots receiving said lugs while providing for limited relative rotation of said plates, said unlocking plate having a cam surface engaging said locking means in either switch-on position, and a switch operator secured to said unlocking plate, the cam surfaces of said unlocking plate, upon movement toward the switch-off position, actuating said locking means to release said cam plate independent of the automatic cam plate release operation of said locking means.

7. For use with a steering column mounted vehicle turn indicator switch of the automatically locked and automatically unlocked type including a rotatable switch plate having contacts selectively cooperable with a plurality of stationary contacts, a rotatable cam plate connected to rotate said switch plate, means biasing said cam plate to a switch-off position, locking means operable, upon rotation of said cam plate to either of a pair of switch-on positions, to lock said cam plate in the operated position, said locking means automatically releasing said cam plate in response to predetermined movements of the vehicle steering mechanism, the improvement comprising manually operable cam plate unlocking means including an unlocking plate arranged for mounting to rotate on the rotational axis of said cam plate and having means establishing a lost motion connection with said cam plate and said unlocking plate being arranged to have a switch operator secured thereto, said unlocking plate, upon movement by said switch operator toward the switch-off position, actuating said locking means to release said cam plate independent of the automatic cam plate release operation of said locking means.

8. For use with a steering column mounted vehicle turn indicator switch of the automatically unlocked type including rotatable switch plate means having contacts selectively cooperable with a plurality of stationary contacts, a rotatable cam plate having projecting lugs interfitting corresponding slots in said switch plate means to rotate the latter, means biasing said cam plate to a switch-off position, locking means engaging said cam plate and effective, upon rotation of said cam plate to either of a pair of switch-on positions, to lock said cam plate in the operated position, said locking means automatically releasing said cam plate in response to predetermined movements of the vehicle steering mechanism, the improvement comprising manually operable cam plate unlocking means including an unlocking plate arranged for mounting to rotate on the rotational axis of said cam plate and having slots receiving said lugs while providing for limited relative rotation of said plates, and said unlocking plate being arranged to have a switch operator secured thereto, said unlocking plate engaging said locking means in either switch-on position and said unlocking plate, upon movement by said switch operator toward the switch-off position, actuating said locking means to release said cam plate independent of the automatic cam plate release operation of said locking means.

9. For use with a steering column mounted vehicle turn indicator switch of the automatically unlocked type including rotatable switch plate means having contacts selectively cooperable with a plurality of stationary contacts, a rotatable cam plate having projecting lugs interfitting corresponding slots in said switch plate means to rotate the latter, means biasing said cam plate to a switch-off position, locking means engaging said cam plate and effective, upon rotation of said cam plate to either of a pair of switch-on positions, to lock said cam plate in the operated position, said locking means automatically releasing said cam plate in response to predetermined movements of the vehicle steering mechanism, the improvement comprising manually operable cam plate unlocking means including an unlocking plate arranged for mounting to rotate on the rotational axis of said cam plate and having slots receiving said lugs while providing for limited relative rotation of said plates, and said unlocking plate being arranged to have a switch operator secured thereto, said unlocking plate having a cam surface engaging said locking means in either switch-on position and said unlocking plate, upon movement by said switch operator toward the switch-off position, actuating said locking means to release said cam plate independent of the automatic cam plate release operation of said locking means.

JESSE R. HOLLINS.

REFERENCES CITED

The following references are of record in the file of this patent:

UNITED STATES PATENTS

| Number | Name | Date |
|---|---|---|
| 1,668,738 | Smith | May 8, 1928 |
| 2,276,413 | Moore | Mar. 17, 1942 |
| 2,280,110 | Weien | Apr. 21, 1942 |
| 2,427,595 | Fuller | Sept. 16, 1947 |